United States Patent
Kirk

(10) Patent No.: US 7,337,425 B2
(45) Date of Patent: Feb. 26, 2008

(54) STRUCTURED ASIC DEVICE WITH CONFIGURABLE DIE SIZE AND SELECTABLE EMBEDDED FUNCTIONS

(75) Inventor: Robert S. Kirk, Mi Wuk Village, CA (US)

(73) Assignee: AMI Semiconductor, Inc., Pocatello, ID (US)

( * ) Notice: Subject to any disclaimer, the term of this patent is extended or adjusted under 35 U.S.C. 154(b) by 316 days.

(21) Appl. No.: 10/860,894

(22) Filed: Jun. 4, 2004

(65) Prior Publication Data

US 2005/0273749 A1 Dec. 8, 2005

(51) Int. Cl.
*G06F 17/50* (2006.01)

(52) U.S. Cl. .................... 716/21; 716/20; 257/409; 257/620

(58) Field of Classification Search ............ 716/20–21; 257/409, 620
See application file for complete search history.

(56) References Cited

U.S. PATENT DOCUMENTS

| | | | | |
|---|---|---|---|---|
| 3,553,830 A | 1/1971 | Jenny et al. | ................... | 29/574 |
| 3,707,036 A | 12/1972 | Okabe et al. | .................. | 29/574 |
| 3,839,781 A | 10/1974 | Russell | .......................... | 29/574 |
| 4,733,288 A | 3/1988 | Sata | ............................. | 357/40 |
| 4,942,447 A | 7/1990 | Park et al. | ..................... | 357/42 |
| 4,978,633 A | 12/1990 | Seefeldt et al. | ................ | 437/51 |
| 5,016,080 A | 5/1991 | Giannella | .................... | 357/45 |
| 5,217,916 A | 6/1993 | Anderson et al. | .............. | 437/51 |
| 5,252,507 A | 10/1993 | Hively et al. | .................. | 437/51 |
| 5,340,767 A | 8/1994 | Flaherty | ....................... | 437/54 |
| 5,350,704 A | 9/1994 | Anderson et al. | .............. | 437/51 |
| 5,459,340 A | 10/1995 | Anderson et al. | ............ | 257/203 |
| 5,656,833 A | 8/1997 | Kajihara | ..................... | 257/203 |
| 5,721,151 A | 2/1998 | Padmanabhan et al. | ........ | 437/51 |
| 5,767,565 A * | 6/1998 | Reddy | ......................... | 257/620 |
| 5,773,854 A | 6/1998 | Pasch | .......................... | 257/202 |
| 5,801,406 A | 9/1998 | Lubow et al. | ............... | 257/202 |
| 5,986,315 A * | 11/1999 | Bost et al. | ................... | 257/409 |
| 6,040,632 A | 3/2000 | Low et al. | ................... | 257/784 |
| 6,373,122 B1 | 4/2002 | Sivilotti et al. | ............. | 257/620 |
| 6,374,398 B1 * | 4/2002 | Magee et al. | .................. | 716/21 |
| 6,531,345 B2 | 3/2003 | Farnworth et al. | .......... | 438/130 |
| 6,953,956 B2 * | 10/2005 | Or-Bach et al. | ............ | 257/203 |
| 2005/0023656 A1 * | 2/2005 | Leedy | ......................... | 257/678 |
| 2006/0028241 A1 * | 2/2006 | Apostol et al. | ................ | 326/41 |
| 2006/0139057 A1 * | 6/2006 | Or-Bach et al. | .............. | 326/41 |
| 2006/0267661 A1 * | 11/2006 | Lim et al. | ................... | 327/295 |

* cited by examiner

*Primary Examiner*—Thuan V. Do
*Assistant Examiner*—Naum B. Levin
(74) *Attorney, Agent, or Firm*—Workman Nydegger

(57) ABSTRACT

One embodiment of the present invention provides for a master or universal base and base tooling which addresses the general purpose Structured ASIC requirements. Another embodiment of the present invention provides for a common set of base tooling from which the master/universal base is created as well as additional custom bases with customized selection and quantity of embedded Platform ASIC functions. Embodiments can utilize conventional Structured ASIC architecture and processing and are compatible with traditional probing and packaging.

48 Claims, 14 Drawing Sheets

STRUCTURED ASIC DEVICE WITH CONFIGURABLE DIE SIZE AND SELECTABLE EMBEDDED FUNCTIONS

BACKGROUND OF THE INVENTION

1. The Field of the Invention

The present invention relates to the field of Application Specific Integrated Circuit (ASIC) design and tooling. In particular, the present invention relates to systems and methods for reducing the number of base wafer designs and reducing tooling costs associated with design and fabrication of structured and platform ASIC devices.

2. Background and Related Art

Various approaches are used to build custom logic Integrated Circuit ("IC") devices. Different components, such as, for example, prefabricated Programmable Logic Devices ("PLDs") (sometimes referred to as Field Programmable Gate Arrays ("FPGAs")), gate arrays, standard cells (sometimes referred to as cell-based ICs), and hand-crafted custom logic, can be used to implement a custom logic IC device. Each of the different components is associated with a number of design parameters, such as, for example, development cost, unit cost, design cycle time, manufacturing cycle time, flexibility, risk, complexity, performance, and power consumption. Accordingly, selection of a particular component for use in a custom logic IC can be made based on the design parameters of the component.

FPGA devices are essentially high-volume standard products and are cost effective for low-volume or low-complexity devices. On the other hand, cell-based and hand-crafted custom ICs may be more appropriate for high-volume high-complexity devices. In between, gate-array devices have typically been used to implement medium-complexity, medium-volume devices.

However, gate arrays often lack the flexibility to support more complex functionality such as, for example, large amounts of memory, timing generator functions and other specialized functions (e.g., processors and I/O physical interfaces). Thus, cell-based and hand-crafted custom ICs are used to implement this more complex functionality. Unfortunately, with advances in process technology, the resulting development cost of cell-based and hand-crafted custom IC's is rising exponentially, due at least in part to the cost of photolithographic reticle tooling. This increased development cost essentially limits the use of cell-based and hand-crafted custom IC's to very high-volume cost-sensitive applications. That is, it may be difficult to implement high-complexity low-volume applications in a cost efficient manner.

More recently, a new class of devices, often referred to as Structured ASICs, has emerged to fill the gap between the FPGA and cell-based approaches. Structured ASICs utilize pre-fabricated base wafers which include resources for logic, memory, timing generators and may include other specialized functional blocks, commonly referred to as Intellectual Property (IP). The base wafers are then personalized with a reduced number of customized metal and/or via interconnection levels to produce the desired custom logic device. Structured ASICs share similarity with gate arrays in that both use a base wafer approach. Like gate arrays, each Structured ASIC family requires a set of bases (e.g., from 6 to 12), covering a range of silicon die sizes to address the needs of different size devices and corresponding packages.

However, structured ASICs differ from gate arrays by including more embedded functions and by pre-designing or fixing more interconnection layers. By minimizing the number of customized interconnection levels required, the tooling development costs can be reduced significantly. Other recent tooling mechanisms use more advanced process technology (i.e., more expensive tooling) for base wafers and less advanced process technology (i.e., less expensive tooling) for the customized levels. These more recent mechanisms distribute the development cost of the base wafer across multiple custom logic devices to reduce overall development cost. Along with relatively lower development cost for a small number of less expensive customized interconnect level tooling, the total tooling cost for a device may be substantially reduced.

One challenge in selecting the architecture of structured ASIC devices is deciding what type of and in what quantity pre-designed functional blocks should be embedded in the base. If the appropriate IP functions are not included, the corresponding device will not be usable for certain applications. If too many embedded IP functions are unused in a particular application, significant silicon area will be unused, potentially making the cost of the device too high.

One solution is to build a special type of structured ASIC called a platform ASIC that addresses the needs of a particular set of applications. For example, a communications platform ASIC might include I/O processing cores and I/O physical interfaces, whereas a signal processing platform ASIC might include Digital Signal Processing (DSP) processing components and A/D and D/A converters. However, developing multiple platforms each requiring a number of bases (e.g., 6 to 12) requires a significant financial investment.

Further, there are other tooling costs in addition to the photolithographic reticles discussed above. These costs include reticles for flip-chip style pad ReDistribution Layers ("RDLs"), wafer probe cards, and customized IC package development. Each base in a Structured (or Platform) ASIC family will require these additional types of tooling, and thus, will incur some additional corresponding cost, which can usually be distributed across multiple custom logic devices.

Prior art contains various approaches to reducing the number of base wafers required to implement a gate array family. One approach uses a borderless gate array to print a sea of transistors across the surface of the die. The actual die border is defined by scribe lines in the programmable levels. In this manner a one-size-fits-all base is created from which different size die can be created.

However, the borderless approach faces several problems. One problem is finding an effective way to achieve isolation from the scribe line region. Scribe lines defined in the programmable levels may provide good definition of the cutting region but since scribe lines typically do not extend into base layers, good isolation is difficult to achieve.

A second problem arises due to the intrinsic differences between transistors designed for use in core logic functions and those intended for use in I/O functions. Typically the I/O transistors are much larger, operate with different voltages and require special ESD protection structures. With the borderless approach it is desirable to be able to use any part of the base for core logic functions and any part for I/O functions. Various approaches have been used to achieve dual-use transistors, but the disparity in core and I/O transistor requirements continues to widen, making it evermore difficult to create efficient dual-use structures.

Most borderless approaches do not handle alignment marks and other photolithograhic and processing artifacts very efficiently, often resulting in significant wasted silicon real estate. Accordingly, it may be difficult to align repeating patterns on the base with repeating patterns on programmable levels. Many existing mechanisms avoid this alignment issue by intentionally wasting space. As such they are typically directed to prototyping and are typically not useful for volume production.

Prior art also includes the concept of a base wafer with borders in one-dimension. These borders effectively create strips of core cell logic functions and I/O functions. The strip dimensions are fixed in one direction, but as wide as the wafer in the other direction, permitting a range of rectangular sized die to be created by defining scribe lines in the programmable levels.

To some extent, the one-dimensional bordered arrays solve the problem of sharing core logic and I/O functions. However, one-dimensional bordered arrays require that I/O functions are restricted to running along the two side borders. Thus, problems with isolation in the scribe line regions in the unbordered direction and problems with repeating patterns of alignment and other manufacturing artifacts still exist.

Additionally, prior art includes base wafers with borders in two-dimensions. The resulting rectangular regions may be clustered or stitched together to form a larger die. However, these two-dimensional bordered arrays have been limited to the traditional sea-of-transistor architecture. They use traditional I/O ring architectures and route I/O from the interior portions of the I/O rings to wire-bond pads around the periphery of the final die. Some two-dimensional bordered arrays include circuitry in the scribe line regions specifically for bridging signals from one region to another.

The two-dimensional bordered arrays solve some of the scribe line, core logic and I/O function problems. However, problems related to isolating circuitry in the scribe line regions and dealing with the multitude of alignment, manufacturing and testing artifacts placed on a wafer surrounding the individual die still exist. These problems are particularly acute when the base die reticle fields have a different repeat sequence than the programmable level reticle fields. Accordingly, what would be advantageous are systems and methods for reducing the number of bases and reducing base tooling expenses associated with structured and platform ASICs while optimizing die size for individual applications.

BRIEF SUMMARY OF THE INVENTION

The principles of the present invention are directed towards reducing the number of base wafer designs and reducing tooling costs associated with design and fabrication of Application Specific Integrated Circuit (ASIC) devices. One embodiment provides for a master or universal base and base tooling which addresses the general purpose Structured ASIC requirements. Another embodiment provides for a common set of base tooling from which the master/universal base is created as well as additional custom bases with customized selection and quantity of embedded Platform ASIC functions. Embodiments can utilize conventional Structured ASIC architecture and processing and are compatible with traditional wafer probing and packaging methods and technologies.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention are directed towards reducing the number of base wafer designs and reducing base tooling expenses associated with structured and platform ASICs while optimizing die size for individual applications.

Generally, silicon wafers used in the fabrication of integrated circuits can be partially fabricated up through a desired processing level (e.g., to implement partial IC functionality). The wafer at this stage is commonly referred to as a "base wafer". To accomplish this, one or more levels are created through a conventional photolithographic process involving a series of printing and processing steps. For each level, a pattern is printed on a reticle with appropriate alignment marks for aligning of the reticle to the previous levels on the base wafer. The pattern of the reticle is applied to the surface of the base wafer to print a pattern on a portion of the wafer. Then, the reticle is stepped to other locations on the wafer using the alignment marks to print the pattern on a different wafer location. The use of alignment marks facilitates alignment between different levels and across different regions of the base wafer. Printing, movement, and alignment can continue until an appropriate repeating pattern results. Base wafers can be stored for further processing at a later time.

Figure 1A:
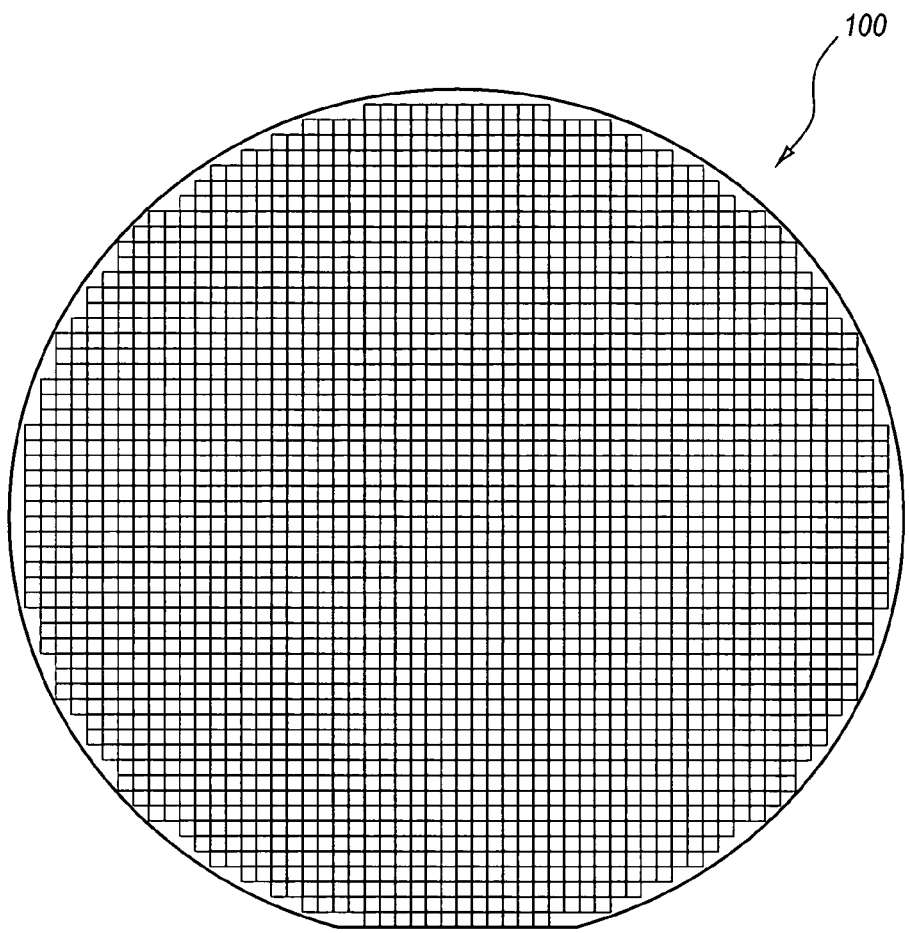
FIG. 1A illustrates a universal integrated circuit base wafer with individual base die.

FIG. 1A illustrates an integrated circuit ("IC") base wafer 100 with individual base die. Base wafer 100 can be fabricated using a set of reticles, each having a pattern and appropriate alignment marks. As depicted in FIG. 1A, base wafer 100 includes a plurality of repeating individual die (represented by the space within the lines). Base level scribe lines surround each of the individual die in base wafer 100 (indicating where individual die to are to be cut).

Subsequently, the stored base wafers can be retrieved and further processed (e.g., to implement customized IC functionality). Unlike conventional IC fabrication, this invention allows processing which can include utilizing a grouping pattern on a customized reticle to group individual die into die clusters.

Figure 1B:
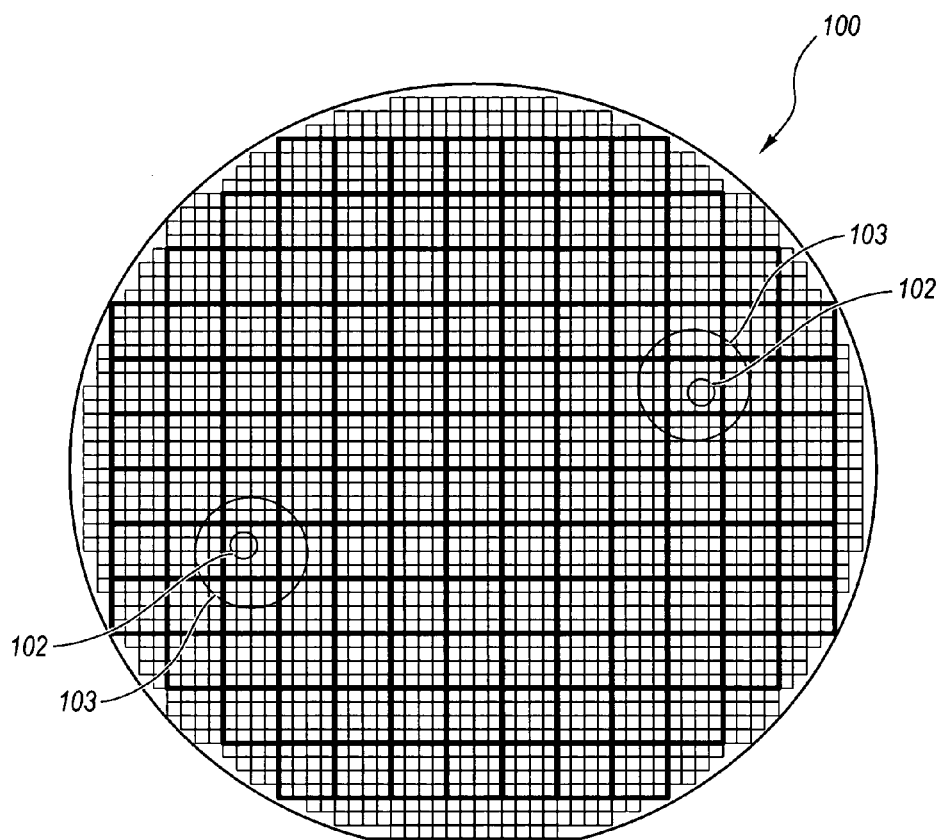
FIG. 1B illustrates the universal integrated circuit base wafer of FIG. 1A with individual base die grouped into corresponding customized die clusters.

FIG. 1B illustrates the IC base wafer 100 with individual base die grouped into corresponding customized die clusters (represented by the space within thicker lines). Customized die clusters can be printed on top of individual die using a conventional IC photolithographic processing approach with customized reticles. Each of the customized die clusters can include one or more individual die. FIG. 1B depicts groupings of four-by-four individual die (16 individual die total) within each customized die cluster. However, the customization process can be utilized to create a wide variety of different individual die grouping configurations (e.g., 1×6, 2×3, etc.). It may be even that a customized die cluster includes a single individual die.

Figure 1C:
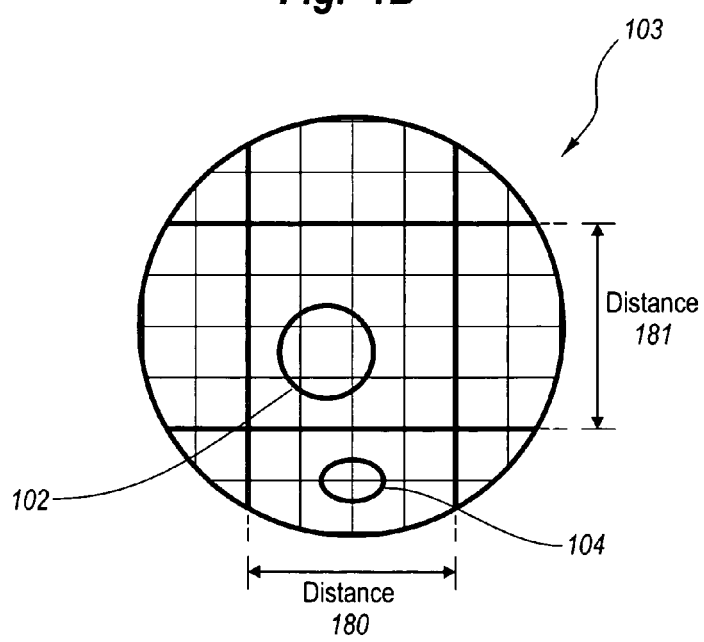
FIG. 1C illustrates a more detailed view of an example die cluster region

FIG. 1C illustrates a more detailed view of an example die cluster region 103. Although the die cluster region 103 centers on a particular die cluster, portions of surrounding die clusters are also shown for context. Similarly, although the individual base die region 102 centers on an individual base die, surrounding individual base dies are also shown within the region for context. The size of an individual die cluster can vary across a range of appropriate sizes. However, in FIG. 1B the distances 180 and 181 can be some number of millimeters, such as, for example, in a range from 4 to 10 mm. Scribe line intersection region 104 includes an intersection of scribe lines included in base wafer 100.

The regular and repeating structure of base wafer 100 is thus customized by printing an appropriate interconnection pattern for each customized die cluster on the final layers. The resulting interconnection pattern of die cluster 103 interconnects various components of base wafer 100 to one another. Interconnections between individual base die as well as within individual base die can be facilitated with upper level interconnects. Scribe lines on the customized levels surround each of the custom die clusters (indicating where custom die clusters are to be cut) and thereby define the final die size.

Since customized die cluster patterns 103 are printed on top of individual die patterns (e.g., of base wafer 100), not all scribe lines between individual die will be completed during the fabrication process. That is, based on the customized die cluster configuration, only some of the base level scribe lines will be co-incident with custom level scribe lines. Co-incident base level scribe lines are extended up into the customized levels resulting in a completed scribe line. A customized die cluster can be cut from the wafer using this completed scribe line.

However, other base level scribe lines (e.g., base level scribe lines not on a boundary between customized die clusters) will be internal to a customized die cluster. That is, the customized die cluster interconnections between the individual die essentially cover over these internal base level scribe lines. Accordingly, these internal base level scribe lines are left incomplete and are not used during the wafer fabrication process. Since these covered internal base level scribe lines remain intact during fabrication, functional resources embedded in the covered internal base level scribe lines can also be interconnected to and used by the rest of circuitry forming a customized die cluster.

Figure 1D:
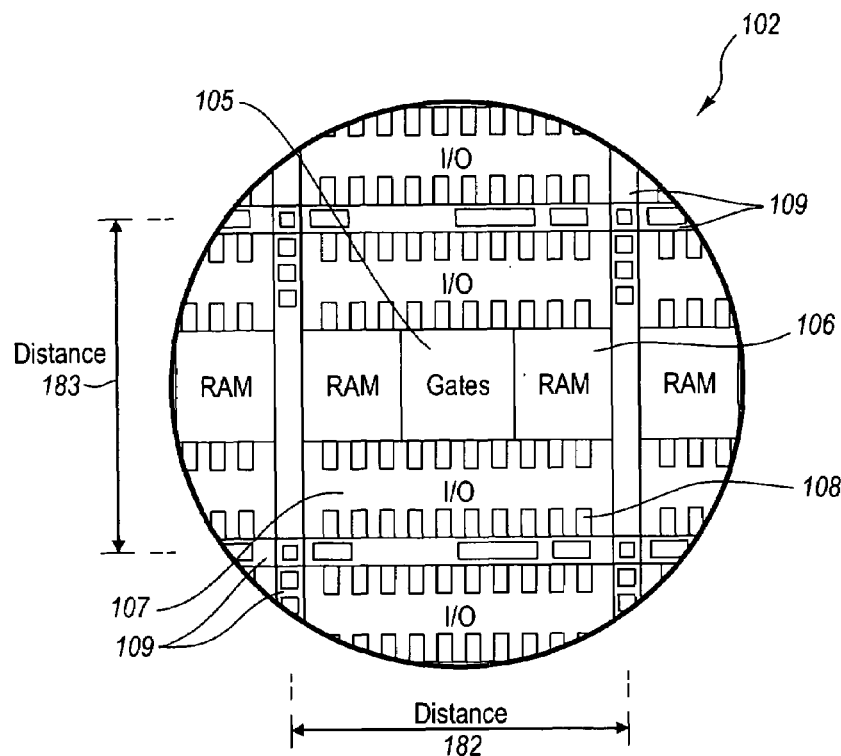
FIG. 1D illustrates a more detailed view of an individual base die region.

FIG. 1D illustrates a more detailed view of an individual base die region 102. As depicted, an individual base die (as bounded by scribe line regions 109) can include, but is not limited to, logic gates 105, memory 106, I/O resource 107, and flip-chip solder bump sites or bond pads 108. Scribe line regions 109 surround these other components of the individual base die. Scribe line regions 109 are essentially isolation regions designed to surround the active silicon device area and protect the device from the destructive effects of scribing and cutting of a wafer into individual die.

In some embodiments, I/O resources are distributed around the periphery of an individual base die and can include bond pads for bond wire connections to the package. In other embodiments, a flip-chip redistribution layer ("RDL") is utilized to spread out I/O cell connections to flip-chip solder bumps. Thus, in these other embodiments, I/O cells may be grouped together in large rectangular regions, allowing electro-static discharge ("ESD") energy to dissipate and allowing creation of I/O cells with efficient aspect ratios.

The size of an individual base die cluster can vary across a range of appropriate sizes. However, in FIG. 1D, distances 182 and 183 can be some number of millimeters and are smaller than or equal to distance 180. For example, referring back to FIG. 1C, a four-by-four array of individual die are included in each customized die cluster.

Figure 1E:
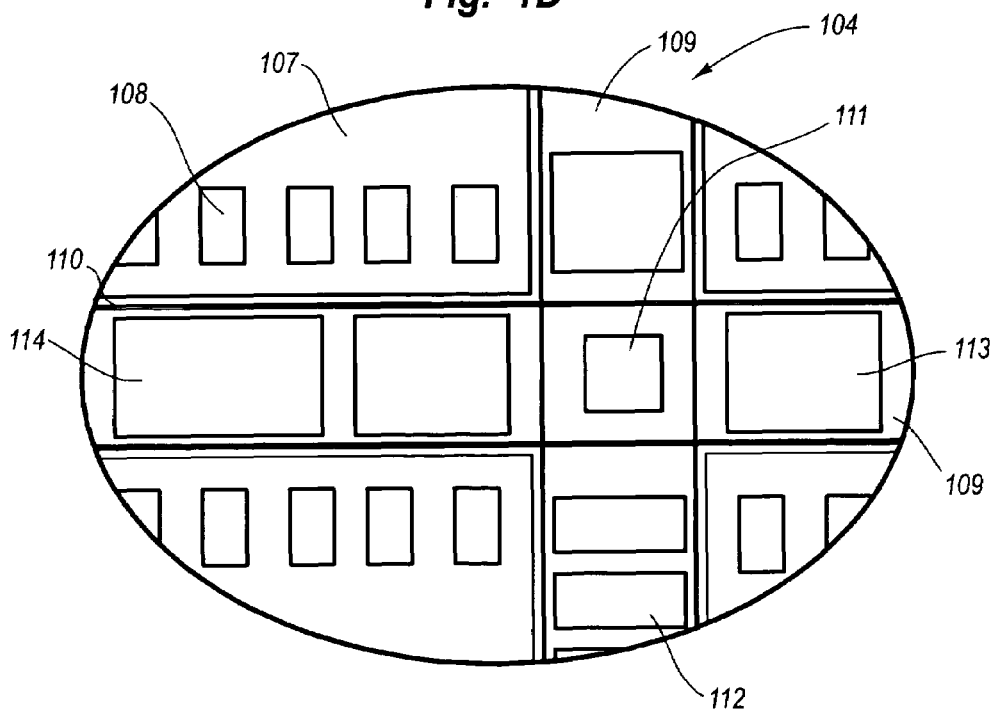
FIG. 1E illustrates a more detailed view of a scribe line region between four individual base dies.

FIG. 1E illustrates a more detailed view of a scribe line intersection region 104. Scribe line intersection region 104 depicts scribe line regions 109 that separate four individual base dies. Some of the components of the individual base dies, such as, for example, I/O module 107 and flip-chip solder bump sites or bond pads 108 of the upper left individual base die, are also depicted. Furthermore, there are also other components even within the scribe line regions 109. Such other components include, for example, guard rings 110, alignment marks 111, process monitor devices 112, scribe-line monitor devices 113, and embedded circuit or function region 114. Alignment marks 111, process monitor devices 112, and scribe-line monitor devices 113 can be used during the wafer fabrication process. Process monitor devices 112 and scribe-line monitor devices 113 can be probed and examined before they are destroyed during the scribing process. During printing, alignment marks 111 can be utilized to align a reticle for a die cluster with alignment marks on previous layers, such as, for example, associated with the individual die of base wafer 100.

Guard rings 110 isolate active silicon regions (i.e., the portions that would remain after scribing) from inactive silicon regions (i.e., the portions separated by scribing). Scribing may then occur along finished (or completed) scribe lines as defined by the clusters. This provides significant flexibility in the configuration of the resulting die. Furthermore, the scribe lines that are not cut during die separation (e.g., covered internal base level scribe lines) may themselves contain useful circuitry. For example, if a vertical scribe line is cut and an intersecting horizontal scribe line remains uncut, circuitry in the horizontal scribe line area remains protected and useable.

The guard ring locations can be pre-designated in a repeating interconnect pattern along all scribe lines that are potentially subject to scribing. Guard rings can extend into the scribe line area such that corresponding portions of circuitry (in a partially completed scribe line) are protected and can remain intact after a cut along a perpendicular adjacent (or intersecting) finished (or completed) scribe line.

Figure 1F:
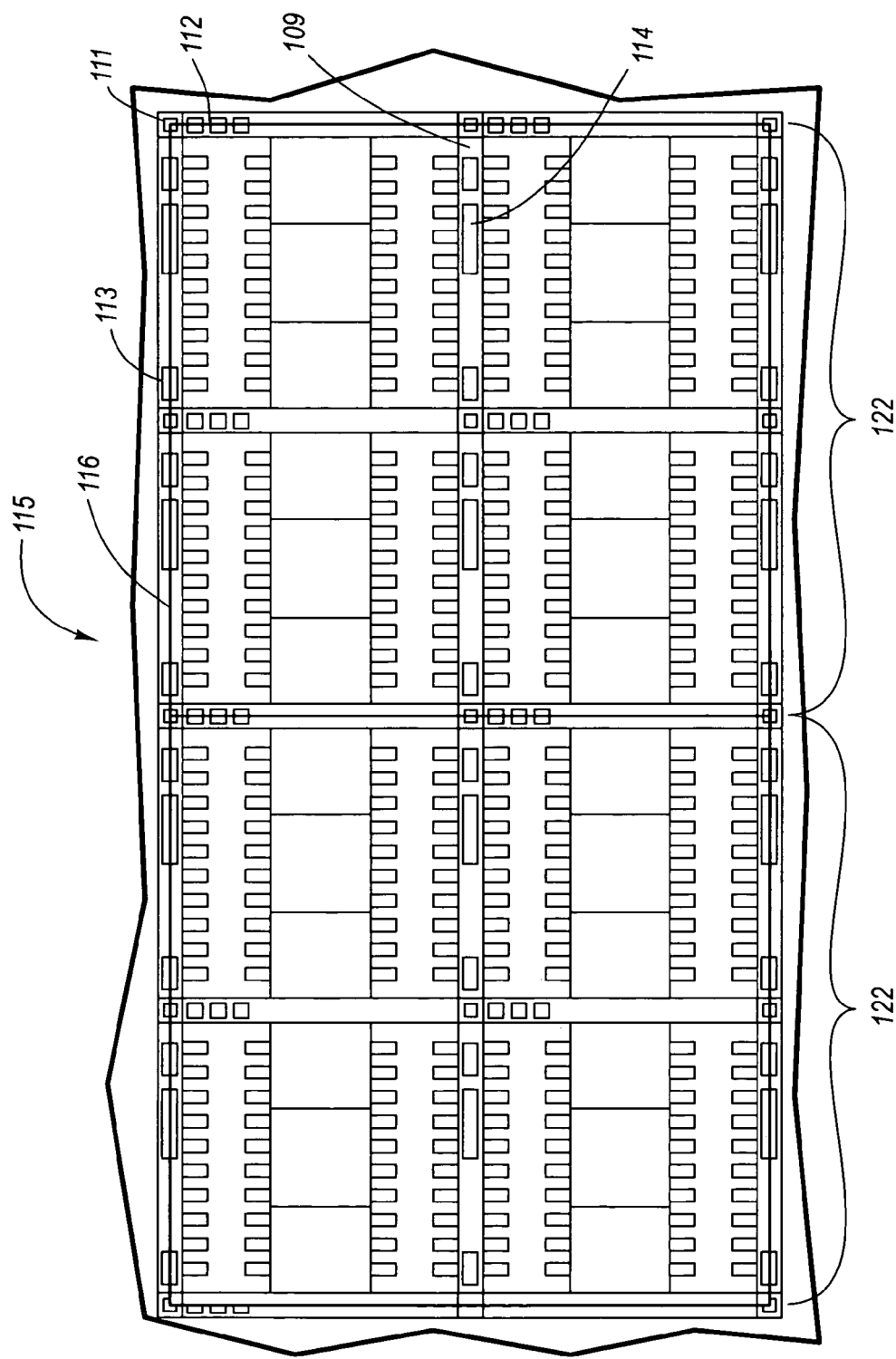
FIG. 1F illustrates customized die clusters formed from grouping corresponding pluralities of individual base die together.

FIG. 1F illustrates customized die clusters formed from grouping corresponding pluralities of individual base die together. More specifically, portion 115 represents a portion of the surface of a customized IC wafer. Portion 115 depicts two customized die clusters 122 each including four individual die (in a two-by-two configuration). Finished scribe lines 116 (represented by the solid lines following the mid-line of the scribe lines) at the boundaries of each customized die cluster 122 indicate locations where portion 115 is to be cut. Alignment marks 111, process monitor devices 112, and scribe-line monitor devices 113 are also depicted.

Scribe line regions internal to a cluster (e.g., scribe line regions 109) represent unused silicon area. Through appropriate isolation, each scribe line region can include a region where resources can be embedded. For example, embedded region 114 depicts a region where resources can be embedded in scribe line region 109. Any number of different resources can be embedded in embedded region 114, such as, for example, logic fabric (e.g., sea of gates or sea of macros), I/O blocks (e.g., I/O cells, bond pads, flip-chip solder bumps, or ESD protection), memory, timing generators (e.g., delay locked loops or phase locked loops), I/O physical interfaces (e.g., dual-data-rate PHYs, or high-speed serial/de-serializers), and processors. Thus, at least some of the space consumed by scribe line regions can be reclaimed and used to implement the desired functionality of an IC device.

Figure 1G:
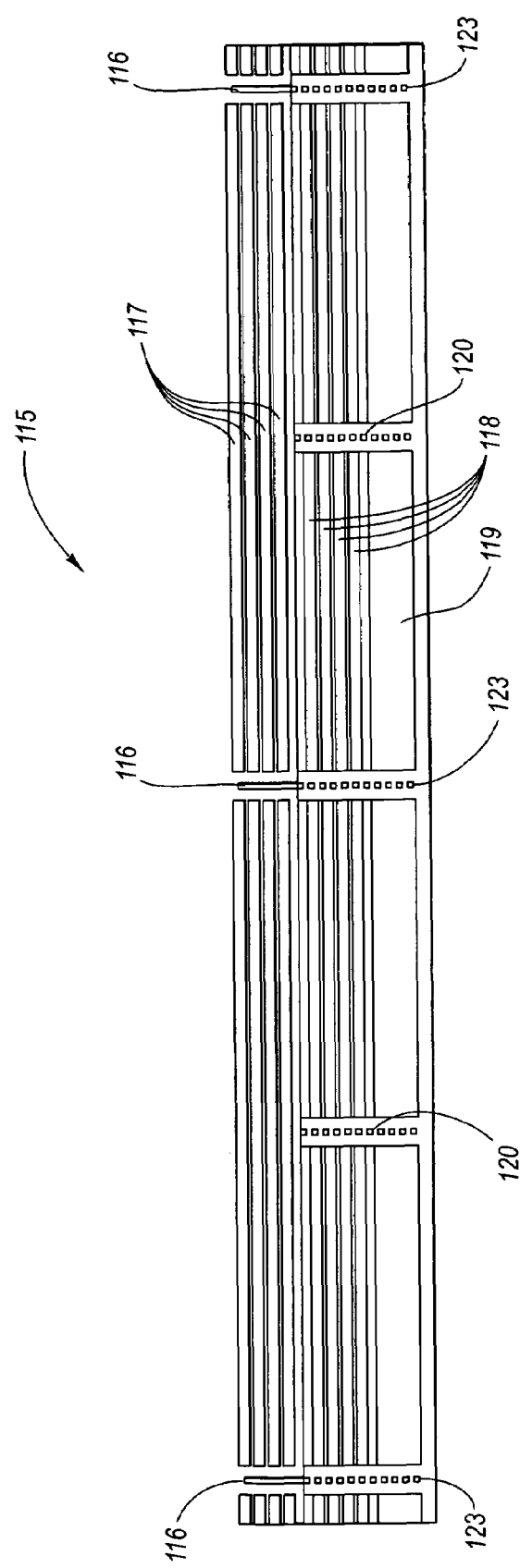
FIG. 1G illustrates the section view of the customized die clusters of FIG. 1F.

FIG. 1G illustrates a section view of the customized die clusters of FIG. 1F. Interconnects on the upper customizable levels 117 personalizes the design by connecting with the predefined interconnect 118 and active devices 119 in base wafer portion 115. Interconnect on the upper customized levels 117 can span the partially formed base isolation regions 120 (covered base level scribe lines) as necessary to complete connections in and between the regions. The customized 117 can thereby be used to define the size of the final die cluster depending on how many individual die are used and in what configuration.

The customized levels also place scribe lines 116 around each of the (two-by-two) customized die clusters 122. These scribe lines complete those base level scribe lines (e.g., in region 123) which correspond to the size of the final customized die cluster. Any number of predefined interconnect levels 118 and customizable levels 117 may be used. The customizable interconnect levels 117 may include any mix of predefined and customizable metal and via levels in any configuration.

Embodiments of the present invention can facilitate creation of a universal base wafer. Any number of reticle tooling levels can be utilized to create a universal base wafer. Reticle tooling can be used as part of a photolithographic process to imprint a reticle field on a wafer. The photolithographic process can be optimized by placing multiple die images in the reticle field, which are then stepped and repeated or scanned across the wafer, exposing a photoresist. Other examples of photolithographic processes that can be used to create a base wafer include: full field, stepper, scanner, laser, and e-beam. When complete, the surface of the wafer contains a uniform array of individual base die.

Figure 2A:
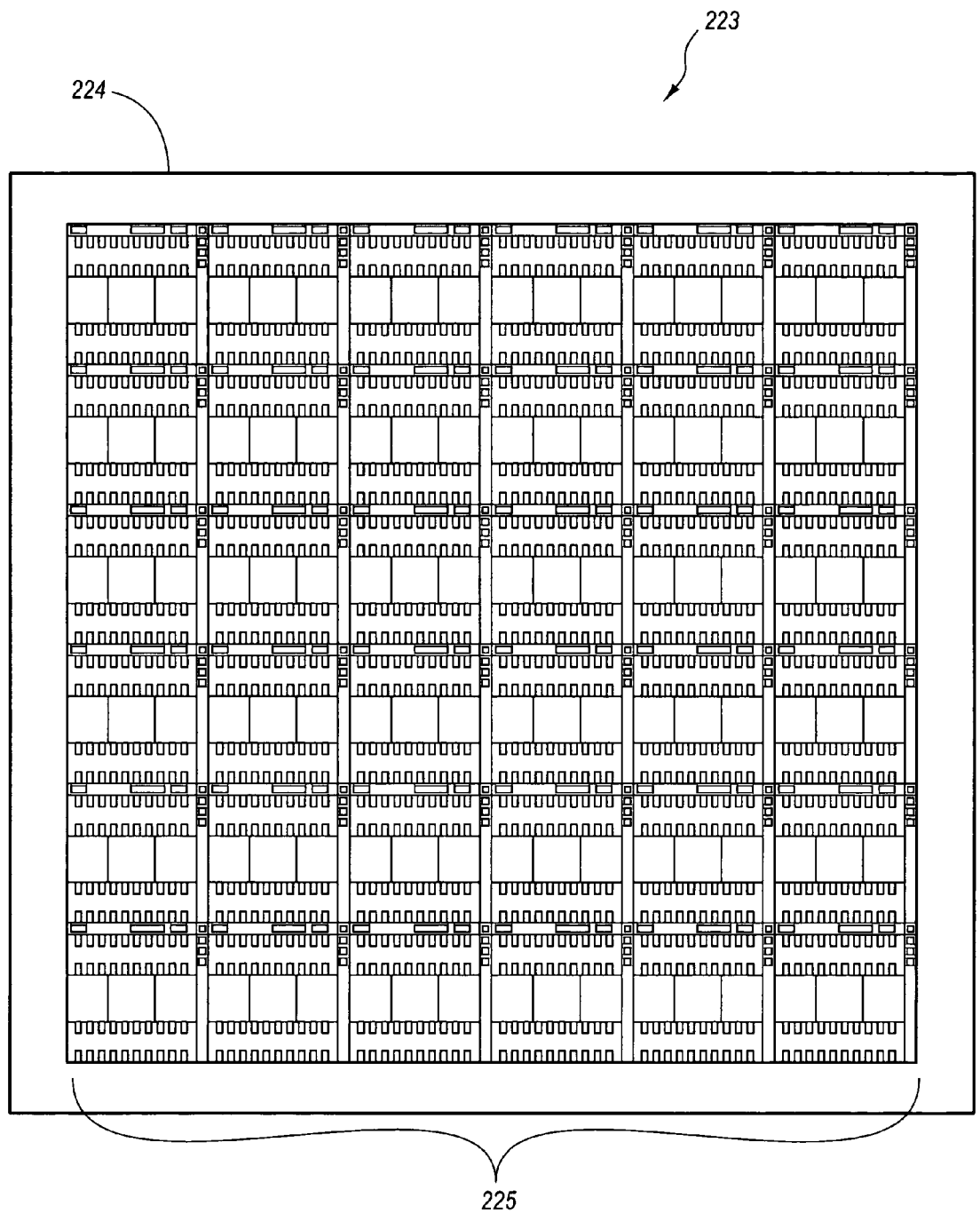
FIG. 2A illustrates a reticle field filled with a repeating pattern of base die.

FIG. 2A illustrates an example reticle field 224 that includes reticle tooling 223 for one level of a universal base wafer. Reticle tooling 223 is configured in a six-by-six configuration 225 of individual die images (e.g., each representing an area bounded by thin lines in FIGS. 1A and 1B). Reticle field 224 can be can be repeatedly moved and printed on a wafer as previously described. For example, multiple imprints of reticle tooling 223 can be used to create the pattern of base wafer 100. Scribe line regions of a reticle field can be designed separately from the base die themselves and create a pattern which repeats every field dimension, as opposed to every die dimension (freeing up space to place circuitry and functions in scribe line regions that are to be covered over). The scribe line regions are designed such that any special embedded resources 114 are repeated on the die dimension.

Figure 2B:
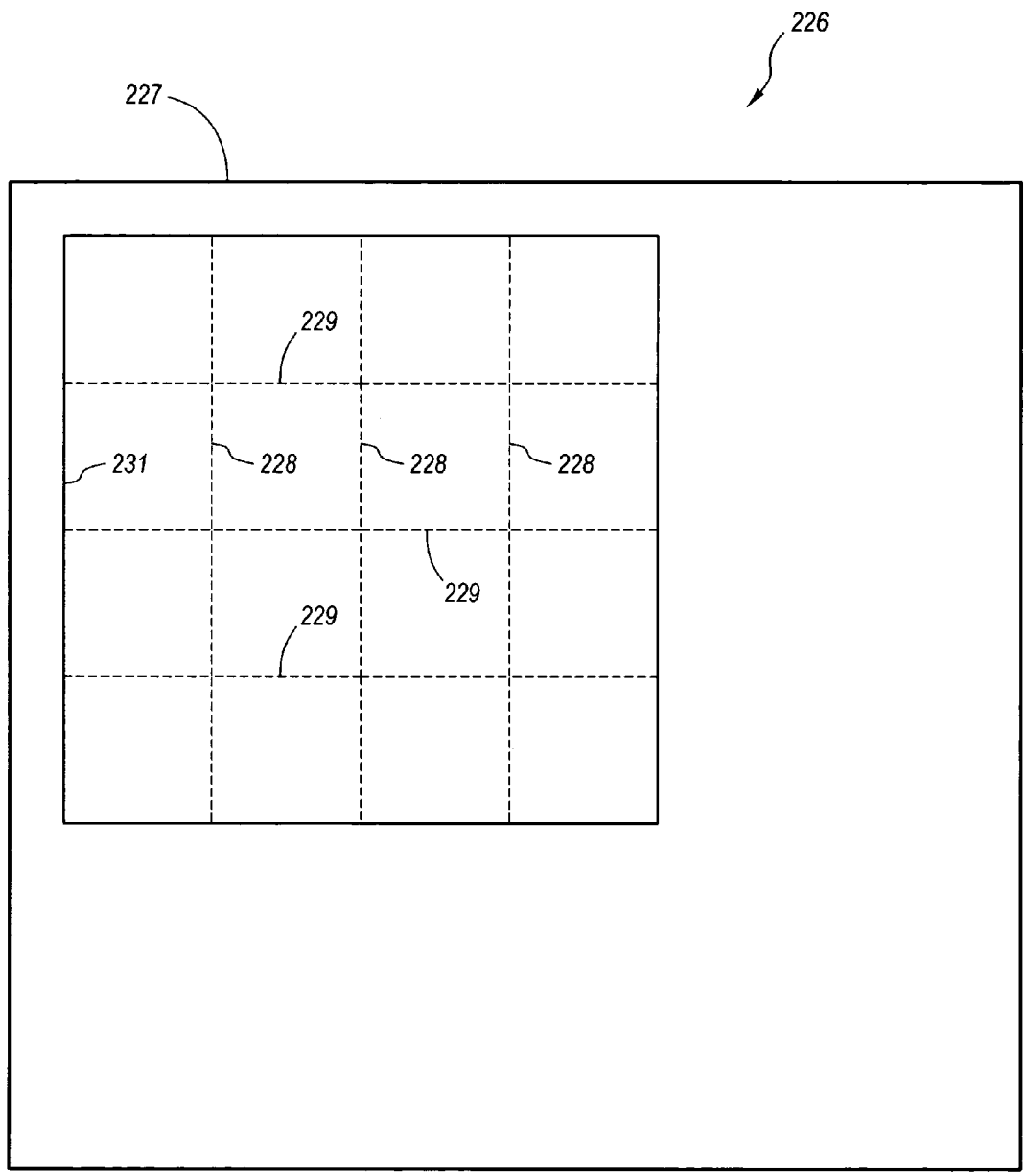
FIG. 2B illustrates a reticle field filled with the outline of a die cluster pattern.

A wide variety of reticle tooling configurations can be used to create the pattern of base wafer 100. For example, it may be that reticle tooling configured as a six-by-six or even three-by-five configuration of individual die images is used to create the pattern of base wafer 100. Increasing the number of individual die images in reticle tooling 223 reduces the number of times reticle field 224 must be imprinted to create the pattern of base wafer 100. Thus, it may that reticle field 224 is filled with as many die images 225 as possible to correspondingly reduce the number of wafer printing steps to as few as possible FIG. 2B illustrates a reticle field 227 that includes reticle tooling 226 representing the outline of a die cluster pattern. Reticle tooling 226 defines a custom die cluster configuration that is to group four-by-four individual die when printed on a base wafer. For example, reticle tooling 226 can be printed on base wafer 100 to create the areas bounded by the thicker lines in FIG. 1B. The vertical dashed lines 228 and horizontal dashed lines 229 represent underlying individual die boundaries (e.g., scribe line regions that result from printing reticle tooling 223) that are to be covered over (and thus become internal to a custom die cluster) when reticle field 227 is printed on a wafer (e.g., as depicted in FIG. 1G).

Reticle field 227 can include tooling for completing embedded artifacts in base level scribe line regions that are to be covered (i.e., internal base level scribe line regions). Since base reticle fields and customized cluster reticle fields may be of different configurations (in arrangement and/or number of individual die), scribe line artifacts can be organized in repeating patterns such that no interference is created between artifacts in these fields. For example, artifacts can be placed on a regular repeating grid based on pre-defined internal base level scribe line regions. For example, artifacts can be placed in internal base level scribe line regions corresponding to the locations of vertical dashed lines 228 and horizontal dashed lines 229 (i.e., the covered die boundaries). Artifacts can be placed in patterns which permit any repeat frequency of cluster configuration patterns (e.g., the pattern represented in reticle field 226) to overlay the base pattern (e.g., the pattern of base wafer 100).

A number of different types of artifacts, such as, for example, artifacts required only in the base, artifacts required only in the customizable levels, and artifacts which are composed of features in the base and customizable levels, can be utilized.

Scribe line artifacts which are only required in the base levels can be repeated with a frequency determined by the dimensions of the base reticle field pattern 223. Where these artifacts become part of internal base level scribe lines (e.g. they are covered by customizable levels 228, 229) they can be covered with interconnect. They may optionally be made accessible by cut-outs in the customizable levels. These cut outs can be repeated at all possible beat frequencies of the base reticle field pattern 223 and the customizable field pattern 226.

Scribe line artifacts which are only required in the customizable levels need not have any special provision in the base levels.

Artifacts which originate in the base level scribe line regions and require additional features in the customizable levels to form complete structures can be repeated at all possible beat frequencies of the base reticle field pattern 223 and the customizable field pattern 226.

Figure 3:
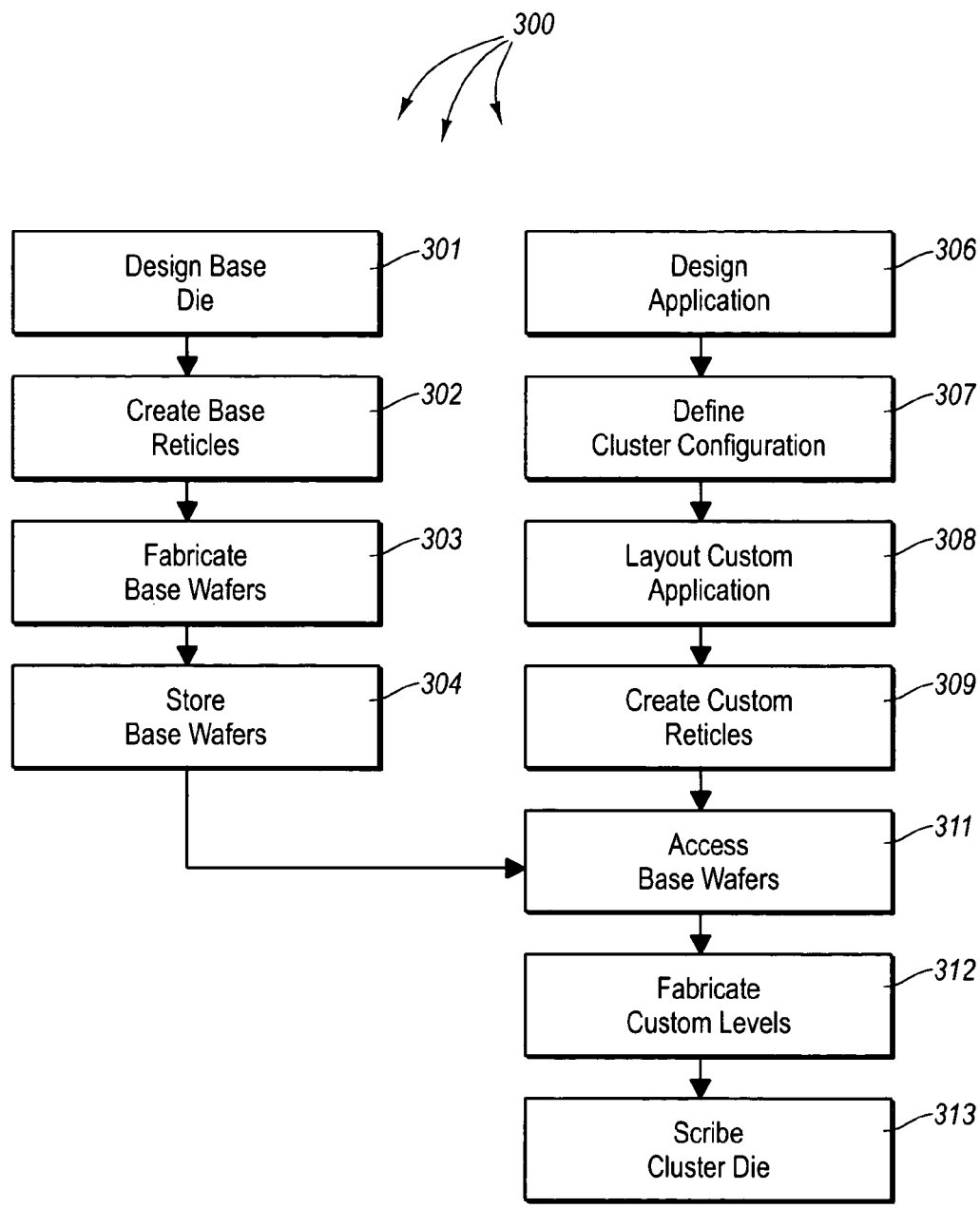
FIG. 3 illustrates an example flowchart of a method for designing and fabricating universal base wafers.

FIG. 3 illustrates an example flowchart of a method 300 for designing and fabricating universal base wafers. The method 300 will be described with some reference to the elements in FIGS. 1A-1G and 2A and 2B. The method 300 includes an act of designing a base die (act 301). Act 301 can occur before any particular customized integrated circuit is planned. A designer can use an appropriate software application to configure various blocks of the base die from cell libraries. A base die can be designed according to conventional ASIC die architecture with I/O cells distributed around the periphery of the base die and with logic and other embedded functions in the core of the base die. Alternately, a base die can be designed according to a modular die architecture with I/O cells, logic and other embedded functions included in blocks and/or I/O cell clusters for ESD dissipation. A base die can be designed such that the used portions of scribe line regions (e.g., corresponding to base level scribe lines potentially covered during customization) can be filled with embedded resources, such as, for example, timing generators and logic fabric.

The method 300 includes an act of creating a set of one or more base die reticles for the base die (act 302). Act 302 can include assembling a set of reticles for a corresponding base based on one or more of the field size, process monitor and scribe line monitor requirements, and any special embedded resources (e.g., to be embedded in embedded region 114). For example, base die reticle with reticle field 224 can be created. Scribe line artifacts (alignment marks, process monitor devices, and scribe line monitor devices) can be organized in a reticle field to avoid interference with customized reticle fields. Scribe lines can be back-filled with embedded functions, such as, for example, timing generators and logic fabric.

The method 300 includes an act of fabricating base wafers (act 303) and an act of storing the base wafers (act 304). At any time, for example, determined by fabrication lead times, base wafers are fabricated and subsequently held in inventory (e.g., in a stockroom). Fabrication of a base wafer can include repeatedly printing a base reticle field (e.g., reticle field 224) on a wafer. This process can be repeated with each reticle in the base reticle set to build up the base wafer with the desired number of levels. A single type of base wafer (e.g. base wafer 100) can be fabricated and held in inventory. This single type of base wafer (a universal base) can then be used for any mix of customized die cluster configurations.

The method 300 includes an act of designing a custom application (act 306) and an act of defining an appropriate die cluster configuration (act 307). A die cluster configuration can be defined to meet the resource requirements of the custom application. A die cluster configuration can be defined to include any number of individual die and can be any of a variety of different arrangements (including square, for example, six-by-six and rectangular, for example, four-by-three). Based on the dimensions of individual die (e.g., 1 mm, 2 mm, etc.), the dimensions of the corresponding die cluster can be determined (e.g., 8 mm, 10 mm, etc.) such that cluster boundaries fall on individual die boundaries. A designer can utilize an appropriate software application to configure a cluster from die libraries.

In some embodiments, one of a set of standardized configurations is defined so as to simplify flip-chip RDL, wafer probing and packaging. In other embodiments, each die cluster configuration is fully customized (e.g., having a different arrangement and/or different number of individual die). In some embodiments, all clusters across a given base wafer are the same. However, in other embodiments, it is possible to mix different sized clusters on a given base wafer.

The method 300 includes an act of laying out the custom application (act 308). For example, after the die cluster configuration is defined, the custom application can be laid out to the die cluster configuration. The method 300 includes an act of creating custom reticles for the custom application (act 309). For example, die cluster reticle with reticle field 227 can be created. Depending on the size of a reticle field and the size of different die clusters, the reticle field of a custom reticle can include one or more (potentially different) die clusters. The method 300 includes an act of accessing base wafers (act 311). For example, it may be that previously fabricated base wafers 100 are pulled from a stockroom.

The method 300 includes an act of fabricating custom levels based on the custom reticle (act 312). For example, reticle field 227 can be repeatedly printed on base wafer 100 to create a customized base wafer. It may be that a base reticle field configuration is similar to a die cluster reticle field configuration. For example, a base reticle field may be a five-by-five configuration of individual die and a die cluster reticle field may be defined to cover a five-by-five configuration of individual die. However, it may also be that a base reticle field configuration differs from a die cluster reticle field configuration. For example, reticle field 224 is a six-by-six configuration of individual die, while reticle field 227 defines a die cluster to cover a four-by-four configuration of individual die. Accordingly, act 312 can include utilizing a photolithographic process capable of maintaining alignment between the base level and other customizable levels with similar or different repeat sequences.

When appropriate, a reticle field with one or more (potentially different) die clusters can be utilized to customize a base wafer. For example, such a reticle field can be repeatedly printed on base wafer 100 to create multiple clusters.

The method 300 includes an act of scribing a custom die cluster (act 313). Individual die clusters are tested with wafer probe test equipment, with good dies scribed and cut from the customized base wafer. For example, good die clusters can be cut from base wafer 100 by cutting along the thicker lines depicted in FIG. 1B.

Other examples of photolithographic processes that can be used to customize a wafer include: laser and e-beam techniques. Laser and e-beam techniques use a raster scan technique to print stripes many individual/cluster die per pass. When many stripes are printed, a full row of die, such as, for example, in FIG. 1B, can be created.

Figure 4A:
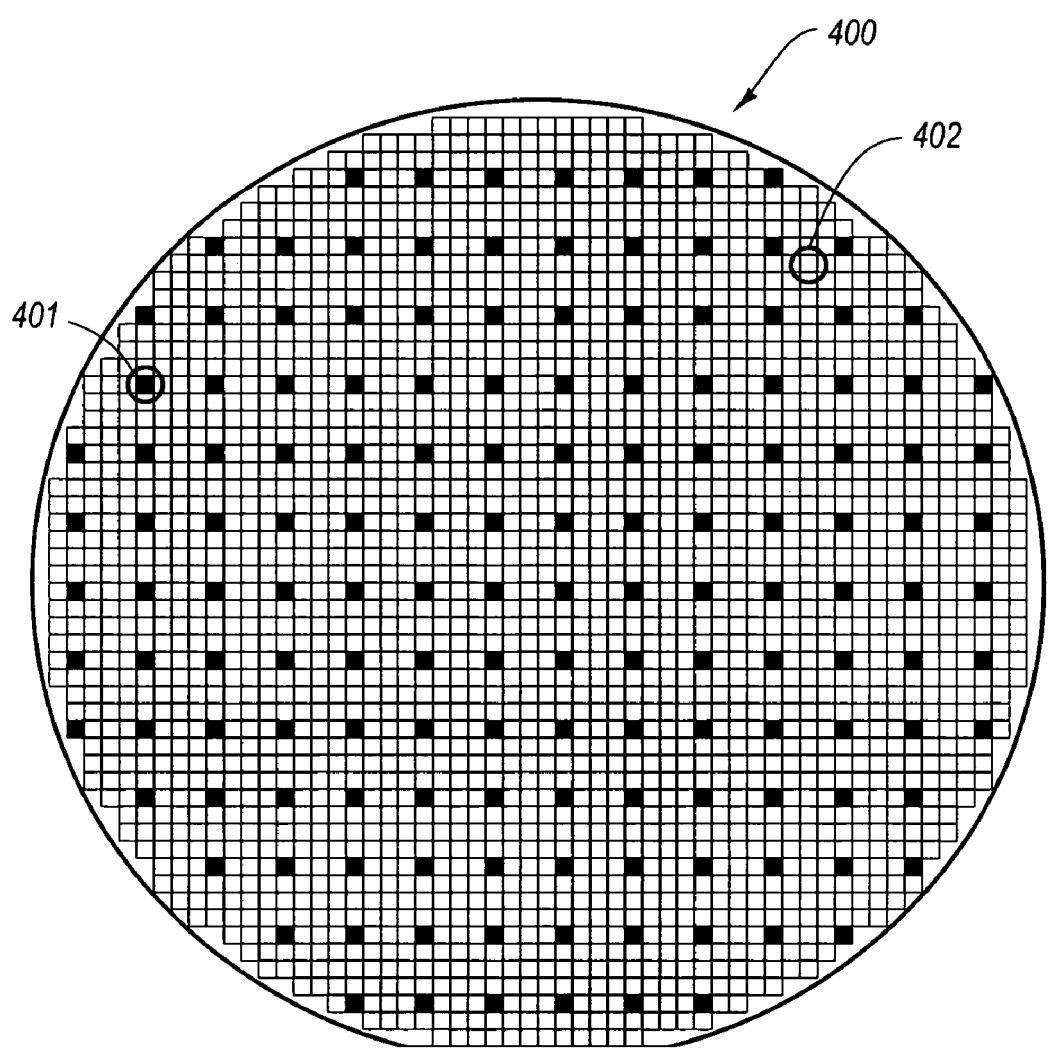
FIG. 4A illustrates a customized base wafer with different types of individual base die.
Figure 4B:
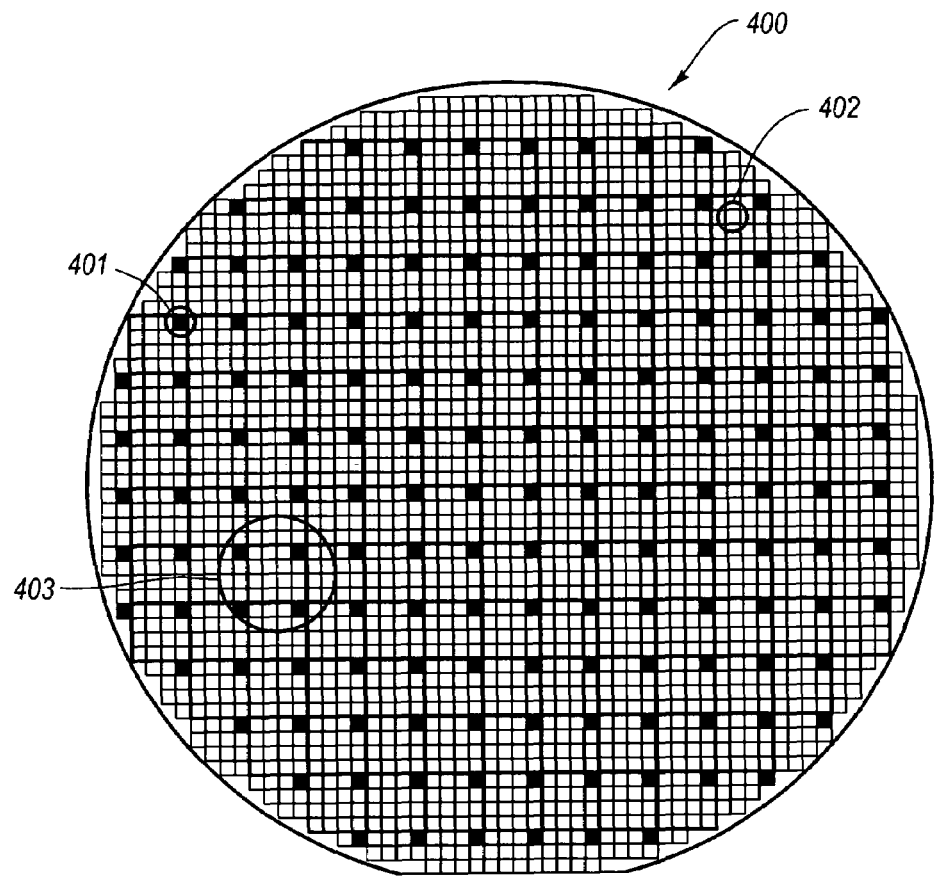
FIG. 4B illustrates the customized base wafer of FIG. 4A with different types of individual base die grouped into corresponding customized die clusters.

FIG. 4A illustrates a customized base wafer 400 with different types of individual base die. As depicted, customized base wafer 400 includes different individual base die regions 401 and 402. Customized base wafer 400 can be created from a universal base reticle set having multiple different individual die patterns. The multiple different individual die patterns can be selectively printed to a base to create customized base wafer 400. Different die patterns can be of similar (or even the same) dimensions. Utilizing alternate die patterns with the same dimensions makes it possible to interchange the alternate die patterns (on the base), while having little, if any, impact on the ability to cluster and scribe arbitrary numbers of base die for larger customized die. FIG. 4B illustrates the customized base wafer of FIG. 4A with different types of individual base die grouped into corresponding customized die clusters.

Figure 4C:
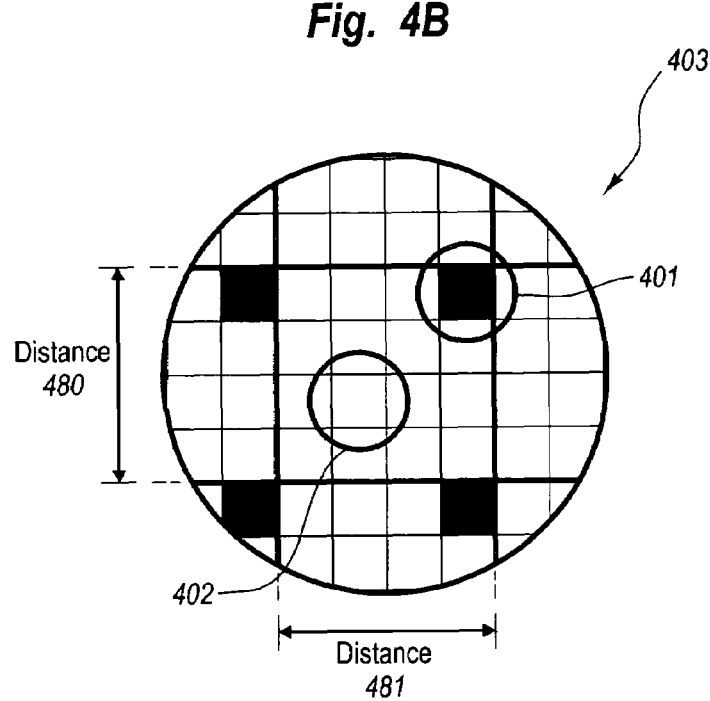
FIG. 4C illustrates a customized die cluster region formed from grouping different types of individual base die.

The different base die patterns can contain various predefined embedded function blocks, such as, for example, included in alternate individual base die region 401. FIG. 4C illustrates a customized circuit die cluster region 403 formed from different types of individual base die, such as, for example, individual die included in individual base die regions 401 and 402. FIG. 4C illustrates how the customized levels would then interconnect these customized circuit die cluster regions 403 as described previously. Interconnection of customized levels facilitates creation of platform ASIC type devices of different sizes and compositions from a single reticle set, potentially significantly reducing NRE cost. The size of an individual die cluster can vary across a range of appropriate sizes. However, in FIG. 4C the distances 480 and 481 can be some number of millimeters, such as, for example, 8 mm. Thus, in FIG. 4D, it may be that distances 482 and 483, for example, represent a 2 mm by 2 mm die size.

Figure 4D:
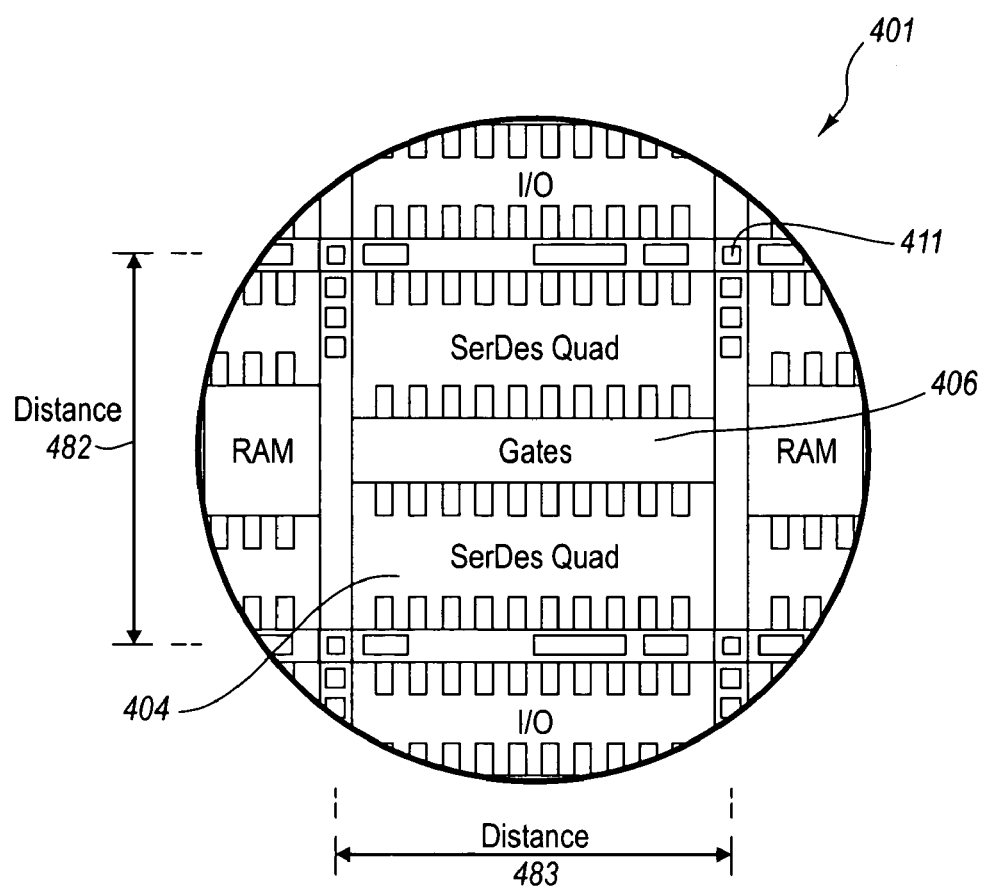
FIG. 4D illustrates an individual base die region.

FIG. 4D illustrates an individual based die region 401. Individual base die 401 is an example composition of an alternative die pattern (from individual base die region 402) which contains a high-speed SerDes I/O block 404 and logic gates 406. Any number of different die patterns containing a variety of different embedded functions is possible. The number of different die patterns can be based on the standardized base die size and the number of alternative die patterns that fit in the reticle field. Alignment marks 411 can be used during the wafer fabrication process.

Figure 5A:
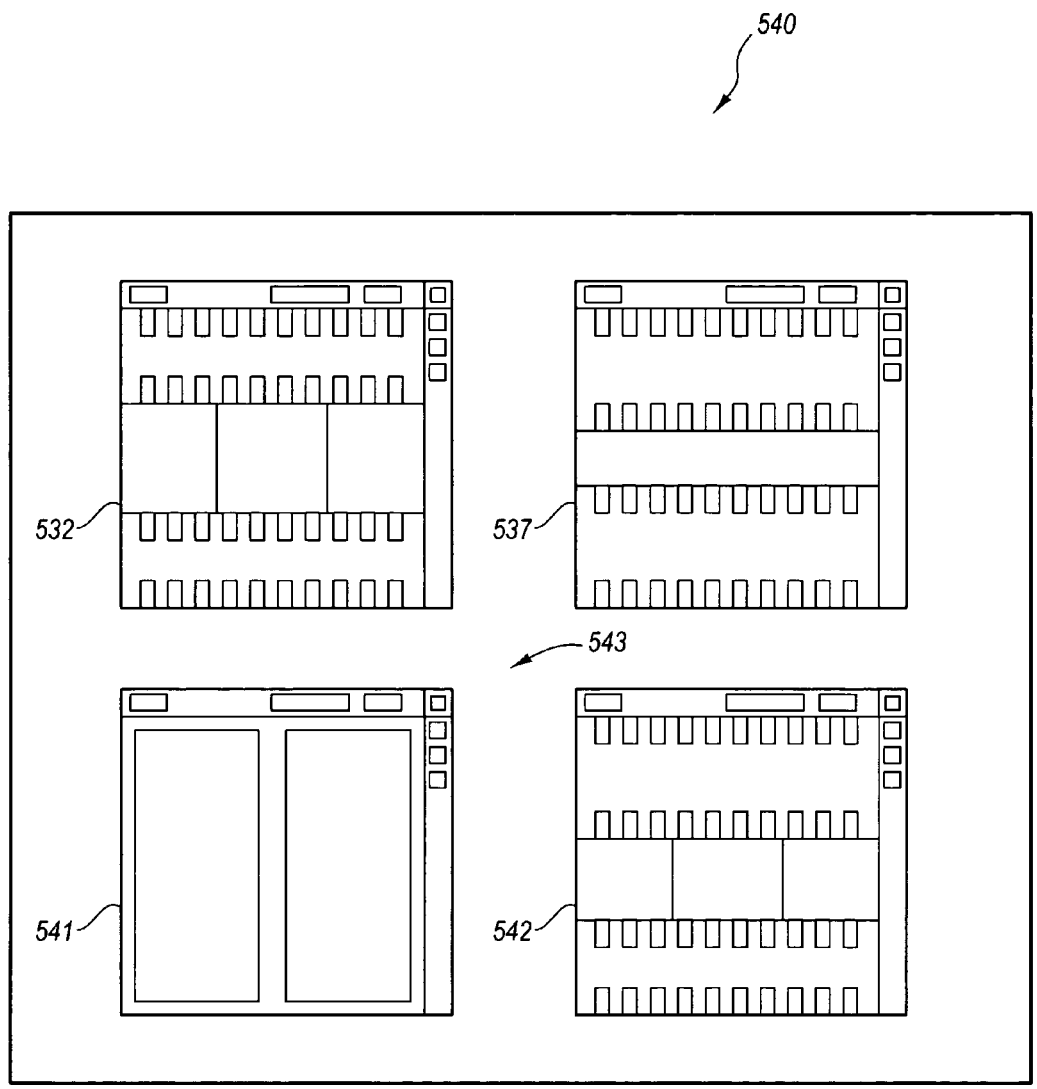
FIG. 5A illustrates a reticle field containing multiple different die patterns and blade space.

FIG. 5A illustrates a reticle field 540 containing multiple different die patterns and blade space. One of these die patterns can be used to print a first type of individual die, while another one of these patterns can be used to print a second type of individual die. For example, pattern 532 can correspond to individual die in individual base die regions 402 and pattern 537 can correspond to individual base die in individual base die regions 401.

Within reticle field 540, four different base die patterns are depicted, including a standard die pattern 532, a SerDes die pattern 537, a die pattern 541 that contains larger memory blocks, and a die pattern 542 that contains dedicated high-speed I/O PHYs. Various mechanisms can be used to selectively expose just a portion of reticle field 540 on a base wafer. These mechanisms can include blading or masking out appropriate (and/or non-desirable) die. Blading or masking out can require extra space 543 between the different die patterns in reticle field 540. Blading or masking techniques can include full field, stepper and scanner.

Figure 5B:
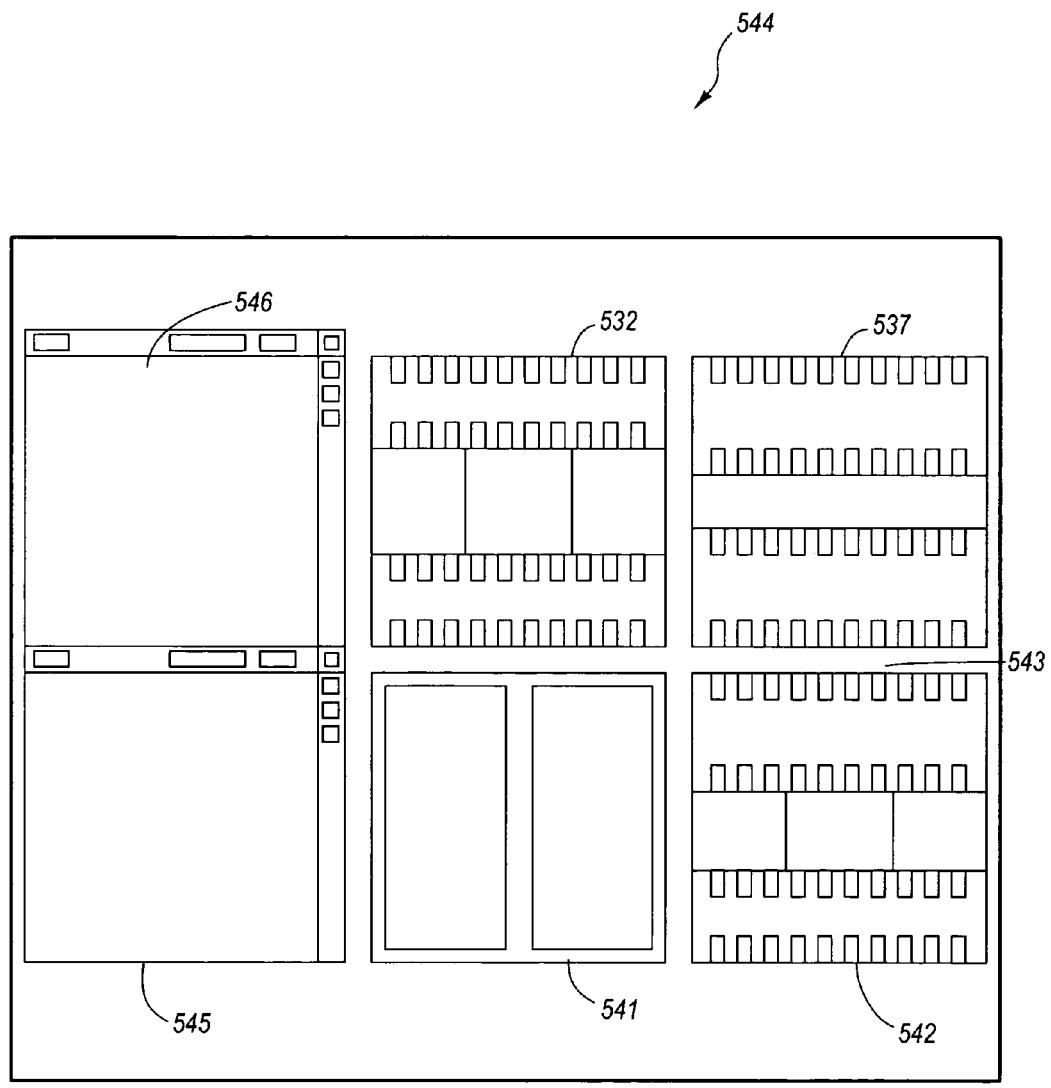
FIG. 5B illustrates a reticle field containing multiple different die patterns, special scribe-line patterns and blade space.

FIG. 5B illustrates a reticle field 544 containing multiple different die patterns, special scribe-line patterns, and blade space. Depicted in reticle field 544 is large scribe line frame 545 and masked regions 546. The large scribe line frame 545 can be exposed first and then individual die 532, 537, 541, and 542 can be exposed over the masked regions 546 in the desired pattern. Accordingly, a number of alternating die patterns can be used in a manner that has little, if any, adverse effect on requirements of process monitors, scribe line monitors, and embedded functions (e.g., embedded in embedded region 114).

Figure 6:
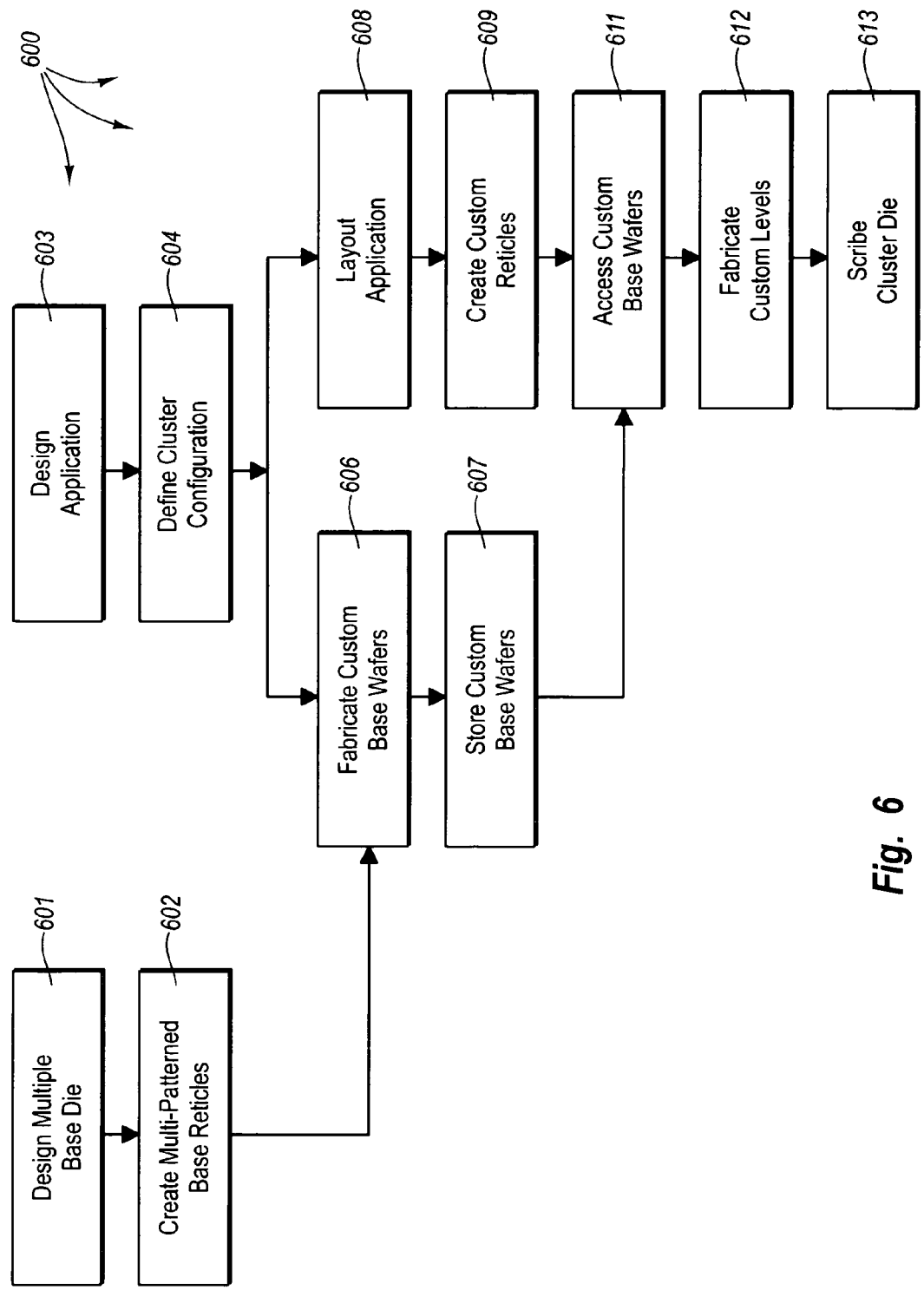
FIG. 6 illustrates an example flowchart of a method for designing and fabricating universal multi-pattern base reticles.

FIG. 6 illustrates an example flowchart of a method 600 for designing and fabricating universal multi-pattern base reticles. The method 600 will be described with some reference to the elements in FIGS. 4A-4D, 5A, and 5B. The method 600 includes an act of designing a multiple base die (act 601). For example, before any particular customized integrated circuit is planned, a universal base reticle (e.g., based on reticle field 540 or 544) can be designed. Design of a multiple base die can include using a software program to configure various blocks of each base die from cell libraries.

The method 600 includes an act of creating a set of multi-patterned base reticles (act 602). For example, a photolithographic process can include printing a number of different die patterns on the same reticle to create a multi-patterned reticle. Multi-patterned reticles can be created based on a die size, process monitor and scribe line monitor requirements, and any special embedded resources.

The method 600 includes an act of designing a custom application (act 603) and an act of defining an appropriate die cluster configuration (act 604). A die cluster configuration can be defined to meet the resource requirements of the custom application. A die cluster configuration can be defined to include any number of different individual die and can be any of a variety of different arrangements (including square, for example, six-by-six and rectangular, for example, four-by-three). Based on the dimensions of individual die (e.g., 1 mm, 2 mm, etc.), the dimensions of the corresponding die cluster can be determined (e.g., 8 mm, 10 mm, etc.). A designer can utilize an appropriate software application to configure a cluster from die libraries.

The method 600 includes an act of fabricating custom base wafers (act 606) and an act of storing the custom base wafers (act 607). At any time, for example, determined by fabrication lead times, custom base wafers are manufactured and subsequently held in inventory (e.g., in a stockroom). Custom base wafers can be fabricated from the multi-patterned recticle, with stepping (or scanning) and blading (or masking sequence) specified by the custom die cluster configuration. For example, during a stepping process, the desired pattern can be selected and exposed. Thus, if there are two die patterns, A and B, on a multi-patterned reticle, rows of individual die can be exposed with the various patterns such as, AAAA, BBBB, ABAB, AAAB, etc. as appropriate.

The method 600 includes an act of laying out the custom application (act 608). For example, after the die cluster configuration is defined, the custom application can be laid out to the die cluster configuration. The method 600 includes an act of creating custom reticles for the custom application (act 609). For example, act 609 is similar to act 309 that can be used to create reticle field 227. Depending on the size of a reticle field and the size of different die clusters, reticle fields of custom reticles can include one or more (potentially different) die clusters.

The method 600 includes an act of accessing custom base wafers (act 611). For example, it may be that previously fabricated custom base wafers are pulled from a stockroom. The method 600 includes an act of fabricating custom levels based on the custom reticles (act 612). When appropriate, a reticle field with one or more (potentially different) die clusters can be utilized to customize a base wafer. For example, such a reticle field can be repeatedly printed on customized base wafer 400 to create multiple clusters. The method 600 includes an act of scribing a die cluster (act 613). For example, individual die clusters are tested with wafer probe test equipment, with good dies scribed and cut from the customized base wafer.

Other photolithographic processes such as, for example, laser and e-beam techniques can be used to customize a wafer that has different individual die. When many stripes are printed, a full row of die, such as, for example, as in FIG. 4B, are created.

Embodiments of the present invention reduce the tooling NRE required to build a master/universal base for structured ASIC and platform ASIC devices. Embodiments of the present invention can utilize conventional architectures to promote compatibility with conventional design and processing tools and flows. Embodiments of the present invention (possibly significantly) reduce the tooling NRE required to build customized bases for platform ASIC devices, for example, by using a single set of reticles.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A customized wafer that can be used to implement a customized application, the customized wafer comprising the following:
    at least one base layer configured in a repeating base pattern of individual die such that different configurations of custom layers can be added on top of the at least one base layer to implement different customized applications, the repeating base pattern of individual die including scribe line regions defining boundaries of each die, the scribe line regions including a guard ring that performs one or more of the following functions should the scribe line region be scribed: 1) protects the individual die from destructive effects of scribing, 2) protects the edge of the individual die from cracking caused by scribing, 3) protects the edge of the individual die from contaminates entering at the edge of the individual die, 4) provides a common collection ring for stray currents that occur when the individual die is performing its operational functions;
    at least one custom layer of a die cluster on top of the repeating base pattern of individual die, the die cluster grouping the resources of one or more individual die contained in the die cluster to implement the customized application; and
    one or more interconnections between the at least one base layer and the at least one custom layer such that the resources in the at least one custom layer can interoperate with resources in the at least one base layer to implement the customized application.

2. The customized wafer as recited in claim 1, wherein the guard rings extend horizontally and vertically through the scribe line regions to protect neighboring die should scribing occur through the scribe line regions, wherein at least some of the scribe line regions of the individual die of the at least one base layer are subsequently covered over by a die cluster grouping of the at least one custom layer, and at least some of the scribe line regions of the individual die of the at least one base layer are subsequently aligned with the periphery of a die cluster grouping.

3. The customized wafer as recited in claim 2, wherein one or more resources for implementing the customized application are embedded in a scribe line region.

4. The customized wafer as recited in claim 3, wherein the one or more embedded resources are repeated on the individual die dimension.

5. The customized wafer as recited in claim 4, wherein a custom layer includes interconnects to resources in a scribe line region of a base layer that was covered over by the custom layer.

6. The customized wafer as recited in claim 3, wherein the one or more resources are selected from among at least a logic gate, an I/O block, a memory, a timing generator, an I/O physical interface, and a processor.

7. The customized wafer as recited in claim 1, wherein the scribe line regions include a repeating pattern of one or more scribe line artifacts, the locations of the one or more scribe line artifacts based on pre-defined scribe lines so as to reduce interference with custom layers.

8. The customized wafer as recited in claim 7, wherein scribe line artifacts are placed on a regular repeating grid based on pre-defined base level scribe line regions.

9. The customized wafer as recited in claim 7, wherein scribe line artifacts are placed in patterns that permit any repeat frequency of die cluster configuration patterns to overlay the repeating base pattern.

10. The customized wafer as recited in claim 7, wherein scribe line artifacts are placed in scribe line regions corresponding to individual die boundaries.

11. The customized wafer as recited in claim 1, wherein the one or more interconnect levels comprises one or more customized metal levels.

12. The customized wafer as recited in claim 1, wherein the one or more interconnect levels comprises one or more customized vias.

13. The customized wafer as recited in claim 1, wherein the one or more interconnect levels comprise an interconnect level that crosses scribe lines between two individual base dies included in the same die cluster.

14. The customized wafer as recited in claim 1, wherein I/O resources are distributed around the periphery of an individual die.

15. The customized wafer as recited in claim 1, wherein grouping resources in a cluster facilitates dissipation of electrostatic discharge (ESD) energy and creation of I/O cells with efficient aspect ratios.

16. The customized wafer in accordance with claim 1, wherein the die cluster groups the resources of a single individual die such that the scribe line regions associated with the individual die of the one or more base layers aligns with scribe line regions associated with the die cluster of the one or more custom layers.

17. A customized wafer that can be used to implement a customized application, the customized base wafer comprising the following:
    at least one base layer configured in a repeating base pattern of individual die, each repeating base pattern of individual die including one or more different die types, the repeating base pattern of individual die including scribe line regions defining boundaries of each die, the scribe line regions including a guard ring that performs one or more of the following functions should the scribe line region be scribed: 1) protects the individual die from destructive effects of scribing, 2) protects the edge of the individual die from cracking caused by scribing, 3) protects the edge of the individual die from contaminates entering at the edge of the individual die, 4) provides a common collection ring for stray currents that occur when the individual die is performing its operational functions;

at least one custom layer of a die cluster on top of the repeating base pattern of individual die, the die cluster grouping the resources of one or more individual die contained in the die cluster to implement the customized application; and one or more interconnections between the at least one base layer and the at least one custom layer such that the resources in the at least one custom layer can interoperate with resources in the at least one base layer to implement the customized application.

18. The custom wafer as recited in claim 17, wherein at least one individual die of a first individual die type and at least one individual die of a second individual die type are grouped together in a die cluster.

19. The customized wafer as recited in claim 17, wherein the guard rings extend horizontally and vertically through the scribe line regions to protect neighboring die should scribing occur through the scribe line regions, wherein at least some of the scribe line regions of the individual die of the at least one base layer are subsequently covered over by a die cluster grouping of the at least one custom layer, and at least some of the scribe line regions of the individual die of the at least one base layer are subsequently aligned with the periphery of a die cluster grouping.

20. The customized wafer as recited in 17, wherein scribe line regions include a repeating pattern of one or more scribe line artifacts, the locations of the one or more scribe line artifacts based on pre-defined scribe lines so as to reduce interference with custom layers.

21. The customized wafer as recited in claim 20, wherein scribe line artifacts are placed on a regular repeating grid based on pre-defined base level scribe line regions.

22. The customized wafer as recited in claim 20, wherein scribe line artifacts are placed in patterns that permit any repeat frequency of die cluster configuration patterns to overlay the repeating base pattern.

23. The customized wafer as recited in claim 20, wherein scribe line artifacts are placed in scribe line regions corresponding to individual die boundaries.

24. The customized wafer as recited in claim 17, wherein one or more resources for implementing the customized application are embedded in a scribe line region.

25. The customized wafer as recited in claim 24, wherein the one or more resources are selected from among a logic gate, an I/O block, a memory, a timing generator, an I/O physical interface, and a processor.

26. The customized wafer as recited in claim 24, wherein the one or more embedded resources are repeated on the individual die dimension.

27. The customized wafer as recited in claim 26, wherein a custom layer includes interconnects to resources in a scribe line region of a base layer that was covered over by the custom layer.

28. The customized wafer as recited in claim 17, wherein the one or more interconnect levels comprises one or more customized metal levels.

29. The customized wafer as recited in claim 17, wherein the one or more interconnect levels comprises one or more customized vias.

30. The customized wafer as recited in claim 17, wherein the one or more interconnect levels comprise an interconnect level that crosses scribe lines between two individual base dies included in the same die cluster.

31. The customized wafer as recited in claim 17, wherein I/O resources are distributed around the periphery of an individual die.

32. The customized wafer as recited in claim 17, wherein grouping resources in a cluster facilitates dissipation of electrostatic discharge (ESD) energy and creation of I/O cells with efficient aspect ratios.

33. A method for customizing a base wafer to implement customized applications, the method comprising:

an act of providing at least one base layer configured in a repeating base pattern of individual die such that different configurations of custom layers can be added on top of the at least one base layer to implement different customized applications, the repeating base pattern of individual die including scribe line regions defining boundaries of each die, the scribe line regions including a guard ring that performs one or more of the following functions should the scribe line region be scribed: 1) protects the individual die from destructive effects of scribing, 2) protects the edge of the individual die from cracking caused by scribing, 3) protects the edge of the individual die from contaminates entering at the edge of the individual die, 4) provides a common collection ring for stray currents that occur when the individual die is performing its operational functions;

an act of providing at least one custom layer of a die cluster on top of the repeating base pattern of individual die, the die cluster grouping the resources of one or more individual die contained in the die cluster to implement the customized application; and an act of providing one or more interconnections between the at least one base layer and the at least one custom layer such that the resources in the at least one custom layer can interoperate with resources in the at least one base layer to implement the customized application.

34. The method as recited in claim 33, wherein the guard rings extend horizontally and vertically through the scribe line regions to protect neighboring die should scribing occur through the scribe line regions, wherein at least some of the scribe line regions of the individual die of the at least one base layer are subsequently covered over by a die cluster grouping of the at least one custom layer, and at least some of the scribe line regions of the individual die of the at least one base layer are subsequently aligned with the periphery of a die cluster grouping.

35. The method as recited in claim 34, wherein one or more resources for implementing the customized application are embedded in a scribe line region.

36. The method as recited in claim 35, wherein the one or more embedded resources are repeated on the individual die dimension.

37. The method as recited in claim 36, wherein a custom layer includes interconnects to resources in a scribe line region of a base layer that was covered over by the custom layer.

38. The method as recited in claim 35, wherein the one or more resources are selected from among at least a logic gate, an I/O block, a memory, a timing generator, an I/O physical interface, and a processor.

39. The method as recited in claim 33, wherein the scribe line regions include a repeating pattern of one or more scribe line artifacts, the locations of the one or more scribe line artifacts based on pre-defined scribe lines so as to reduce interference with custom layers.

40. The method as recited in claim 39, wherein scribe line artifacts are placed on a regular repeating grid based on pre-defined base level scribe line regions.

41. The method as recited in claim 39, wherein scribe line artifacts are placed in patterns that permit any repeat frequency of die cluster configuration patterns to overlay the repeating base pattern.

42. The method as recited in claim 39, wherein scribe line artifacts are placed in scribe line regions corresponding to individual die boundaries.

43. The method as recited in claim 33, wherein the one or more interconnect levels comprises one or more customized metal levels.

44. The method as recited in claim 33, wherein the one or more interconnect levels comprises one or more customized vias.

45. The method as recited in claim 33, wherein the one or more interconnect levels comprise an interconnect level that crosses scribe lines between two individual base dies included in the same die cluster.

46. The method as recited in claim 33, wherein I/O resources are distributed around the periphery of an individual die.

47. The method as recited in claim 33, wherein grouping resources in a cluster facilitates dissipation of electrostatic discharge (ESD) energy and creation of I/O cells with efficient aspect ratios.

48. The method in accordance with claim 33, wherein the die cluster groups the resources of a single individual die such that the scribe line regions associated with the individual die of the one or more base layers aligns with scribe line regions associated with the die cluster of the one or more custom layers.

* * * * *

UNITED STATES PATENT AND TRADEMARK OFFICE
CERTIFICATE OF CORRECTION

PATENT NO. : 7,337,425 B2 Page 1 of 1
APPLICATION NO. : 10/860894
DATED : February 26, 2008
INVENTOR(S) : Robert S. Kirk et al.

It is certified that error appears in the above-identified patent and that said Letters Patent is hereby corrected as shown below:

Column 7
Line 50, change "personalizes" to -- personalize --
Line 51, change "interconnect" to -- interconnects --
Line 52, change "interconnect" to -- interconnects --

Column 8
Line 38, change "may that" to -- may be that --

Column 9
Line 12, change "interconnect" to -- interconnects --

Column 11
Line 2, change "stripes many" to -- stripes, many --

Column 12
Line 50, change "recticle" to -- reticle --

Signed and Sealed this

Eighteenth Day of November, 2008

JON W. DUDAS
*Director of the United States Patent and Trademark Office*